United States Patent [19]

Chen et al.

[11] Patent Number: 5,369,565

[45] Date of Patent: * Nov. 29, 1994

[54] MODULAR POWER SUPPLY SYSTEM

[75] Inventors: Ieon C. Chen, Laguna Hills; Michael Wilson, Torrance, both of Calif.

[73] Assignee: Innova Electronics Corp., Fountain Valley, Calif.

[ * ] Notice: The portion of the term of this patent subsequent to Jun. 15, 2010 has been disclaimed.

[21] Appl. No.: 969,042

[22] Filed: Oct. 30, 1992

Related U.S. Application Data

[63] Continuation-in-part of Ser. No. 771,684, Oct. 4, 1991, Pat. No. 5,220,269.

[51] Int. Cl.⁵ .............................................. A45F 5/00
[52] U.S. Cl. .................................... 363/146; 224/902; 307/150; 320/2
[58] Field of Search ............................ 320/2; 363/146; 307/150; 224/902

[56] References Cited

U.S. PATENT DOCUMENTS

| | | | |
|---|---|---|---|
| 1,984,398 | 12/1934 | Dame | 429/97 X |
| 2,978,596 | 4/1961 | Robirds | 320/2 X |
| 3,919,615 | 11/1975 | Niecke | 320/2 |
| 3,952,239 | 4/1976 | Owings et al. | 320/2 |
| 3,963,972 | 6/1976 | Todd | 320/2 |
| 3,973,179 | 8/1976 | Weber et al. | 320/2 |
| 4,050,003 | 9/1977 | Owings et al. | 320/2 |
| 5,220,269 | 6/1993 | Chen et al. | 320/2 |

OTHER PUBLICATIONS

*Radio Shack Catalog*, 1992, p. 85, Mobile Mounting Kit (CT-300-302).

*Primary Examiner*—Steven L. Stephan
*Assistant Examiner*—Adolf Berhane
*Attorney, Agent, or Firm*—Stetina and Brunda

[57] ABSTRACT

A portable, handheld power supply system is disclosed for electrically powering a variety of interconnectable power consumption/distribution devices. The system comprises a power supply unit having a battery disposed therein, a power supply unit having first and second side portions and brackets disposed thereon. The brackets are provided with electrical contacts for communicating power between the battery and the interconnected power distribution/consumption devices, the battery being directly connected to the electrical contacts. The brackets are formed to include longitudinal channels extending along side portions of the power supply unit to provide secure mechanical engagement to the power distribution/consumption devices and electrical communication therebetween.

16 Claims, 2 Drawing Sheets

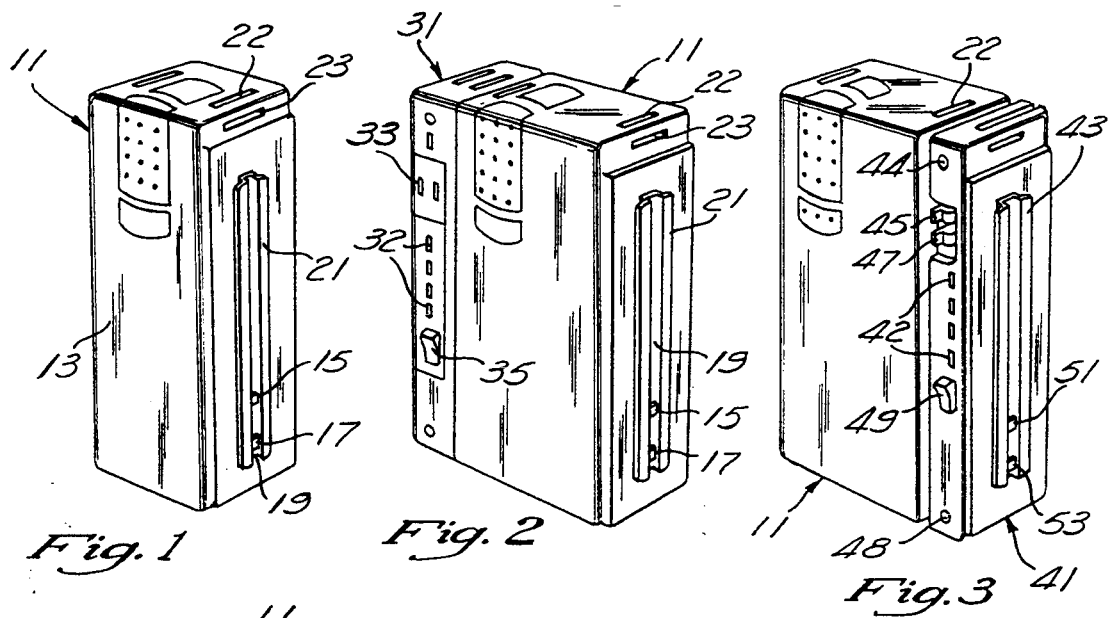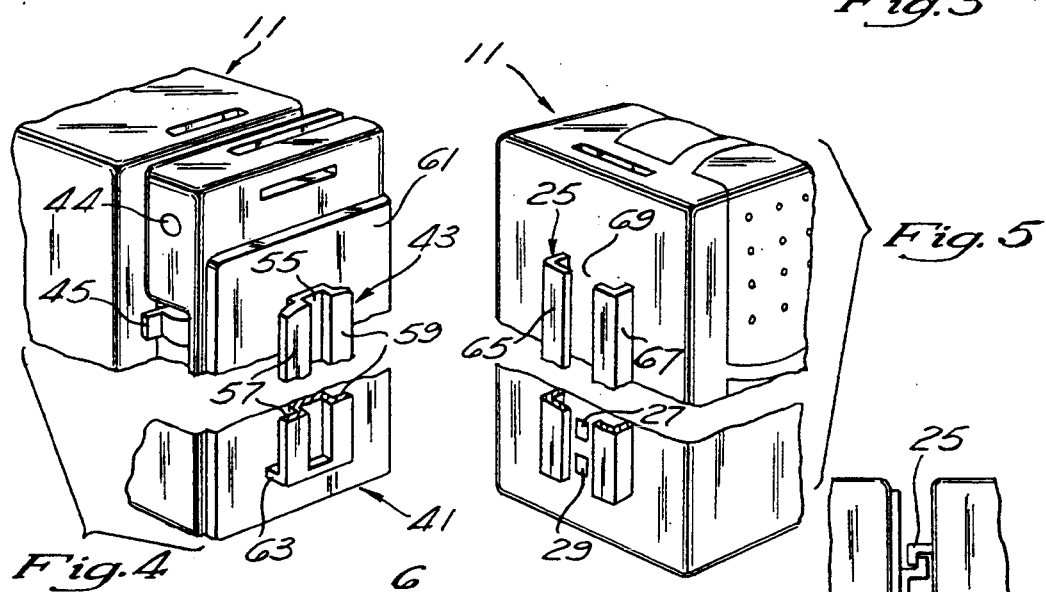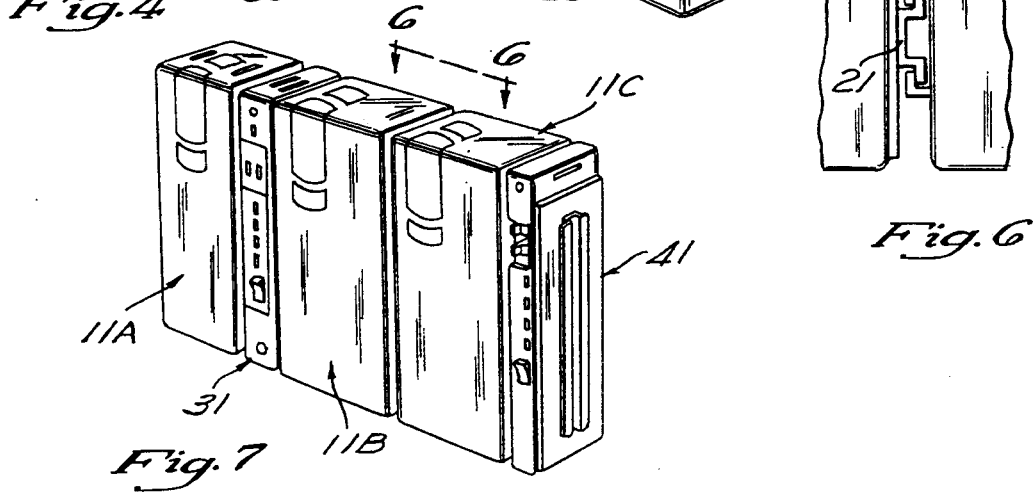

MODULAR POWER SUPPLY SYSTEM

This is a continuation-in-part of copending patent application Ser. No. 07/771,684, filed Oct. 4, 1991, now U.S. Pat. No. 5,220,269.

FIELD OF THE INVENTION

The present invention relates a modular power supply system and, more particularly, it is a portable handheld power supply system which is extendable by interconnection of one or more power supplies and power consumption units.

BACKGROUND OF THE INVENTION

A variety of different types of portable power supplies are currently available. Such products are useful to power lights, radios, video equipment and other power and many other types of power consumption units. Most typically the power supply unit is developed independent of the power consumption units and is interconnectable by means of a flexible wire jack adapted to communicate power between the power supply unit and the separate light, radio, etc. While the interconnection of such products is adequate to generally provide the functionality of a portable power supply unit, such arrangements may be cumbersome to transport and the utilization is typically limited to a stationary location. Moreover, different power consumption units frequently have different voltage and current requirements, and frequently utilize different types of connecting jacks. Thus, it is extremely difficult to utilize a single portable power supply unit to operate various types of power consumption devices.

The present invention is directed to a modular power supply system which utilizes a power supply unit that is interconnectable to a variety of power consumption/distribution devices, such as lights, A/C supplies, and radios. In accordance with the present invention the combination of power supply unit(s) and power consumption device(s) are mechanically and electrically coupled to be readily stored and transported as a consolidated system. The power supply unit may be interconnected to one or more power consumption/distribution devices in a variable chain which provides electrical power and mechanical support to each of the interconnected devices.

SUMMARY OF THE INVENTION

A portable, handheld power supply system is disclosed for electrically powering a variety of interconnectable power consumption/distribution devices. The system comprises a power supply unit having a battery disposed therein, a power supply unit having first and second side portions and brackets disposed thereon. The brackets are provided with electrical contacts for communicating power between the battery and the interconnected power distribution/consumption devices, the battery being directly connected to the electrical contacts. The brackets are formed to include longitudinal channels extending along side portions of the power supply unit to provide secure mechanical engagement to the power distribution/consumption devices and electrical communication therebetween.

The power consumption/distribution devices may include an A/C supply module, D/C supply module, various types of lights, radios or storage compartments. The interconnected devices may each be provided with mating brackets to permit a chain construction incorporation a plurality of power supply units and/or interconnected power consumption/distribution devices and storage compartments.

BRIEF DESCRIPTION OF THE DRAWINGS

FIG. 1 is a front perspective view of a power supply unit in accordance with the present invention;

FIG. 2 is a perspective view of the power supply unit connected to an A/C invertor;

FIG. 3 is a perspective view of the power supply unit connected to a variable D/C supply.

FIG. 4 is an enlarged view of portion of FIG. 3, showing the male mounting bracket in more detail;

FIG. 5 is an enlarged perspective view showing the female mounting bracket;

FIG. 6 is top sectional view showing engagement of the male and female mounting brackets;

FIG. 7 is a perspective view of an interconnected power supply unit incorporating a plurality of power supplies and power consumption devices.

DETAILED DESCRIPTION OF THE PREFERRED EMBODIMENT

Figure 8:
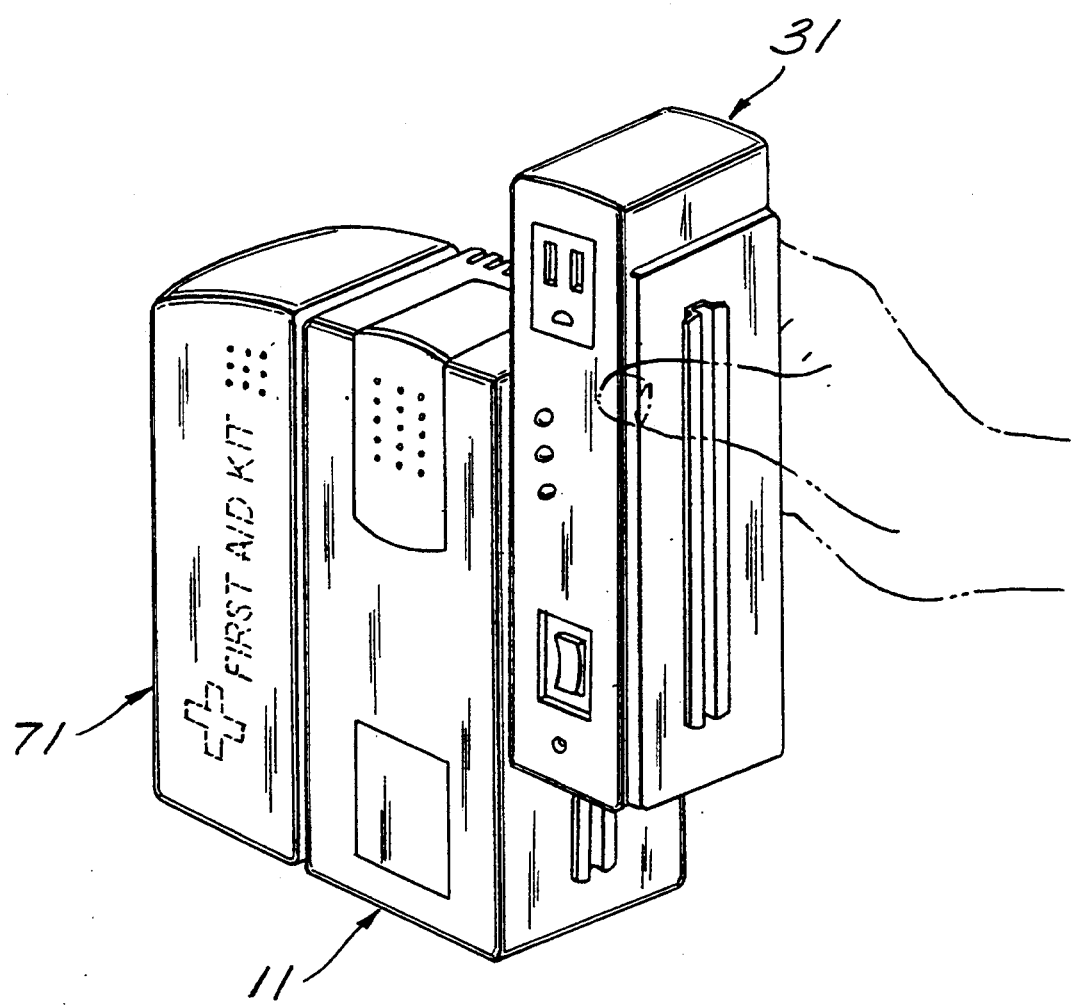
FIG. 8 is a perspective view illustrating interconnection of devices to the power supply unit 11.

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

FIG. 1 is a perspective view of power supply unit 11 formed in accordance with the present invention. The power supply unit 11 is preferably formed as a rechargeable battery disposed within a plastic housing 13. The battery is an electrical communication with contacts 15, 17, disposed within recess 19 of male mounting bracket 21. In the presently preferred embodiment, a fuse is disposed within the power supply unit 11 intermediate the contacts 15, 17 in the internal battery. For economic reasons the power supply unit 11 is formed without the incorporation of switches or other circuitry, thereby reducing the cost of facilitating the manufacture of the power supply unit 11. Consequently, there would be no need to dispose of electrical modules when the power supply unit 11 is disposed of.

The power supply unit 11 may incorporate a custom built battery, or may utilize an existing battery. The battery may be chargeable and/or recyclable. In the presently preferred embodiment the battery is implemented as a 12 volt, 3.0 amphour sealed lead cell. The power supply unit also preferably incorporates a plurality of apertures 22, 23, which permit the power supply unit to be engaged by a carrying strap for convenient transport. As described below the various power supply devices may similarly be provided with such apertures so that the carrying strap may extend the entire length of the interconnected power supply units and power consumption/distribution devices.

As also shown at FIG. 5, the power supply unit 11 may further have a female mounting bracket 25 formed on the power supply unit opposite the male mounting bracket 21. Electrical contacts, such as contacts 15, 17, may similarly be disposed within female mounting bracket 25 in order to communicate electrical power from either side of the power supply unit 11. Alternatively, power supply unit 11 may be formed without any electrical contacts within female mounting bracket 25 thereby utilizing only one side of the power supply unit 11 for electrical connection, and the other side for mechanical support of devices engaging female mounting bracket 25.

FIG. 2 illustrates the power supply unit 11 interconnected to an A/C invertor module 31. The A/C invertor modular 31 is adapted to convert the D/C power from power supply unit 11 to A/C power which may be output to external devices via A/C output plug 33. In the presently preferred embodiment the A/C invertor module 31 is operative to output 120 volts A/C, at a modified sinewave, generating 50 watts of continuous power. The A/C invertor module 31 may preferably be provided with internal overload, prior art polarity and short protection. Toggle switch 35 is operative to activate the A/C invertor modular 31 to generate an output at A/C output plug 33, or wire connectors 45, 47. As with power supply unit 11 the A/C invertor modular 31 is preferably formed to have a male support bracket on one side and a female support bracket on the other side. Thus, the A/C invertor modular 31 may be mechanically and electrically coupled to the power supply unit 11 in such a manner to oppose lateral separation of the power supply unit 11 and A/C invertor modular 31, thereby ensuring electrical communication therebetween.

FIG. 3 illustrates connection of the power supply unit 11 to a variable D/C supply module 41. The variable D/C supply module 41 is again formed to incorporate a male mounting bracket 43 on one side, and a female mounting bracket (not shown) on the opposite side. The variable D/C supply module 41 is operative to receive power from the power supply module at its operating voltage level, e.g. 12 volts D/C, and to convert that power level to a plurality of alternate D/C voltage levels, e.g. 1.5 volts, 3 volts, 4.5 volts, 6 volts, 7.5 volts, 9 volts, 10.5 volts, and 12 volts. The particular voltage ratings which can be provided by the D/C supply module 41 will likely vary dependant upon the particular type of battery being utilized within the power supply unit 11, and the characteristic output of each cell of such a battery. The output voltage level is determined by the setting of a select switch. The output of D/C supply module 41 may be communicated through output plug connector 44 or wire connectors 45, 47. The D/C supply module 41 may also facilitate recharging the power supply unit 11 via recharging plug connector 48. Toggle switch 49 is operative to turn on the variable D/C supply module 41.

It should be understood that the input of power supply unit 11 may be communicated through variable D/C supply module 41 to contacts 51, 53. Thus, additional devices, such as portable lights, radios, etc., may be alternately or additionally powered from power supply unit 11 without the need to be directly connected to power supply unit 11. Contacts 51, 53 may therefore be connected to contacts on the opposing side of power supply unit 11, or in parallel with the remaining circuitry of variable D/C supply module 41, or in such a manner to be empowered only when toggle switch 49 is in an off position.

It is also anticipated that power supply unit 11 and/or the interconnected devices may be provided with a third contact within the mounting bracket. Such third contact would be useful to determine the electrical status of the power supply unit 11, i.e. whether the fuse has blown or etc., the condition of power supply unit 11 may be diagnosed and reflected by indicator lamps, such as indicators 32, 42 shown in FIGS. 2 and 3. The indicator lamps 32, 42 may be used to indicate the charged state of the battery within power supply unit 11, and indicate shorting conditions.

FIG. 4 is an enlarged view of a portion of FIG. 3, showing male mounting bracket 43 in more detail. As shown therein the male mounting bracket 43 is formed to include a central channel 55 and a pair of peripheral extensions, 57, 59, spaced from wall 61. Lower portion of male mounting bracket 43 incorporates a base portion 63 serves to restrain vertical movement of the interconnected female mounting bracket.

FIG. 5 illustrates an enlarged view of a portion of the female mounting bracket 25. As shown therein the female mounting bracket incorporates a pair of L-shaped members 65, 67 which define a space adjacent to the wall 69, into which extensions 57, 59 may be received. As noted above, the power supply unit 11, and/or the power consumption devices may be provided with electrical contacts 27, 29, within the space defined by the female mounting bracket 25.

As will be readily understood by those skilled in the art, the precise manner of interconnecting power supply units and power consumption/distribution devices may be varied from that disclosed herein without departing from the broader aspects of the invention. For example, the precise construction of the male and female mounting brackets may be modified while still providing mechanical support and reliable electrical communication between adjacent devices. The particular manner disclosed herein provides for such mechanical and electrical connection without applying any appreciable mechanical load to the electrical contacts, and while opposing separation of the power supply unit and power consumption/distribution devices as the system is being transported or used.

FIG. 6 provides a top view showing the engagement of the male mounting bracket 21 and female mounting bracket 25. FIG. 8 illustrates the connection/disconnection of devices such as A/C invertor module 31 and container 71 to power supply unit 11. As shown in FIGS. 6 and 8 the arrangement of the male and female mounting brackets permits relative vertical movement between the mounting brackets, but opposes horizontal movement of the interconnected devices. Moreover, the length of the brackets 21, 25 provide substantial engaging surface area to provide mechanical rigidity and strength to the interconnected system, facilitating serial engagement of a plurality of power supply units and power consumption devices.

FIG. 7 illustrates the interconnection of a plurality of power supply units and power consumption devices. The power supply system shown in FIG. 7 incorporates three power supply units, 11A, 11B, 11C serially connected with A/C invertor modular 31 and variable D/C supply 41. As described above the various devices may be provided with electrical contacts on one or both sides facilitating modular construction of a power supply system having different types of output boards, (e.g.

A/C or D/C) and a variety of different types of power consumption devices, e.g. lights, radios, etc. Moreover, a defect in one unit need not affect the operation of the remaining units. One defective unit may further be replaced without the need to replace additional system components. The system may be readily expanded or contracted as desired by the user.

As will be readily appreciated by those of ordinary skill in the art, various types of power consumption units may be incorporated into the system. For example, different types of radios, power consumption devices, such as AM/FM, CBs, short wave, emergency radios, may be implemented in the same modular form having the connecting configuration described above. Similarly, various types of lights, such as flourescent, incandescent, emergency beacons and storage compartments, may also be implemented within the scope of the present invention. In another embodiment an accessory mounting bracket may be formed to be interconnectable to the disclosed mounting brackets, e.g. bracket 21, wherein the accessory mounting bracket would permit supporting engagement of various types of additional devices, such as lights, flashlights, walkie talkies, storage compartments, etc. These and other modifications of the present invention, which will be apparent to those of ordinary skill in the art, may be implemented without departing from the broader aspects of the invention herein.

What is claimed is:

1. A portable, handheld power supply system for electrically powering a variety of interconnectable power distribution consumption devices, comprising:
    a) a power supply unit having a battery disposed therein, the unit further having first disposed therein, the unit further having first and second side portions;
    b) a first bracket disposed on the unit first side portion for engaging and supporting a first accessory device, said first bracket having first electrical contacts formed therein for communicating power between the battery and first accessory device said battery being directly connected to the first electrical contacts;
    c) said first bracket forming a longitudinal channel extending along said unit first side portion for opposing movement of the first accessory device from the power supply unit other than along the longitudinal channel; and
    d) a second bracket disposed on the unit second side portion for receiving and engaging a second accessory device, said second bracket having second electrical contacts formed therein for communicating power between the battery and second accessory device, said battery being directly connected to the second electrical contacts.

2. The power supply unit as recited in claim 1 wherein said first and second brackets have substantially complimentary construction.

3. The power supply unit as recited in claim 1 further comprising an output socket disposed on the body front portion, said output socket being operative to communicate power between the battery and an accessory device.

4. The power supply system as recited in claim 1 wherein the first bracket extends vertically along said unit first side portion.

5. The power supply system as recited in claim 4 wherein the longitudinal channel extends vertically along said unit first side portion.

6. The power supply system as recited in claim 1 wherein said channel is formed intermediate said unit first side portion and the first bracket.

7. The power supply system as recited in claim 1 wherein said first accessory device comprises an A/C invertor module, said invertor having an invertor first bracket disposed along a first side portion thereof and electrical contacts disposed within said invertor first bracket to mechanically engage and electrically communicate with said power supply unit.

8. The power supply system as recited in claim 7 wherein said A/C invertor module is further provided with a second bracket having electrical contacts disposed therein for providing mechanical and electrical connection to second accessory devices.

9. The power supply system as recited in claim 7 wherein said first accessory device comprises a D/C supply module, said D/C supply module having a D/C supply module first bracket disposed along a first side portion thereof and electrical contacts disposed within said D/C supply module first bracket to mechanically engage and electrically communicate with said power supply unit.

10. The power supply system as recited in claim 9 wherein said D/C supply module is further provided with a second bracket having electrical contacts disposed therein for providing mechanical and electrical connection to third accessory devices.

11. The power supply system as recited in claim 10 wherein said D/C supply module second bracket electrical contacts are connectable to said D/C supply module first bracket electrical contacts to facilitate direct communication between the power supply unit and the D/C supply module second bracket electrical contacts.

12. The power supply system as recited in claim 11 wherein the D/C supply module second bracket electrical contacts are connectable to said D/C supply module first bracket electrical contacts only when the D/C supply module is in an off condition.

13. The power supply system as recited in claim 1 further comprising a first accessory device, said first accessory device having a first accessory device first bracket disposed along a first side portion thereof and electrical contacts disposed within said first accessory device first bracket to mechanically engage and electrically communicate with said power supply unit.

14. The power supply system as recited in claim 13 wherein said first accessory device is further provided with a second bracket having electrical contacts disposed therein for providing mechanical and electrical connection to third accessory devices.

15. The power supply system as recited in claim 13 wherein said first accessory device second bracket electrical contacts are connectable to said first accessory device first bracket electrical contacts to facilitate direct communication between the power supply unit and the first accessory device second bracket electrical contacts.

16. The power supply system as recited in claim 15 wherein the first accessory device second bracket electrical contacts are in direct electrical communication with the power supply unit only when the first accessory device is in an off condition.

* * * * *